United States Patent [19]

Dagenais et al.

[11] Patent Number: 4,809,204

[45] Date of Patent: Feb. 28, 1989

[54] OPTICAL DIGITAL MATRIX MULTIPLICATION APPARATUS

[75] Inventors: Mario Dagenais, Wellesley; Wayne F. Sharfin, Lexington; Robert J. Seymour, Wellesley, all of Mass.

[73] Assignee: GTE Laboratories Incorporated, Waltham, Mass.

[21] Appl. No.: 848,198

[22] Filed: Apr. 4, 1986

[51] Int. Cl.[4] .......................... G06F 7/56; G02B 6/00
[52] U.S. Cl. ................................. 364/713; 350/96.34
[58] Field of Search ............. 364/713, 841, 845, 754; 350/96.11, 96.12, 96.13, 96.14, 96.34, 376, 377

[56] References Cited

U.S. PATENT DOCUMENTS 4,567,569 1/1986 Caulfield et al. ............... 350/96.14
4,569,033 2/1986 Collins et al. ...................... 364/713
4,592,004 5/1986 Bocker et al. ..................... 364/713
4,607,344 8/1986 Athale et al. .................... 350/96.14
4,620,293 10/1986 Schlunt et al. ..................... 364/713

OTHER PUBLICATIONS

H. J. Caulfield et al., "Optical Computing: The Coming Revolution in Optical Signal Processing", Laser Focus/Electro-Optics, Nov. 1983, pp. 100–110.

Primary Examiner—Gary V. Harkcom
Assistant Examiner—Long Thanh Nguyen
Attorney, Agent, or Firm—James J. Cannon, Jr.

[57] ABSTRACT

Real-time all-optical multiplication of an n component vector by a large m by m matrix having digital accuracy utilizes an updatable two dimensional spatial light modulator.

9 Claims, 2 Drawing Sheets

OPTICAL DIGITAL MATRIX MULTIPLICATION APPARATUS

BACKGROUND OF THE INVENTION

1. Field of the Invention

This invention relates to optical digital matrix multiplication apparatus and, in particular, to apparatus for performing digital matrix multiplication using cavityless optical bistability. Accordingly, it is a general object of this invention to provide new and improved apparatus of such character.

2. General Background

Traditionally, optical techniques have been based on analog operations such as Fourier transforms performed by lenses and acousto-optic devices. More recently, however (see H. J. Caulfield, J. A. Neff and W. T. Rhodes, "Laser Focus/Electro-optics", Nov. 1983, p. 100), attention has been turned toward the application of optics to mathematical operations. There, operations are numerical, sometimes discrete, and often algebraic in character. The high degree of parallelism available in optics has led to the recent development of non-programmable array processors in which a 100 component vector can be multiplied by a 100×100 matrix in about 20 nanoseconds. Components of an input vector x can be inputted via a linear array of LEDs or laser diodes. The light from each source can be spread out horizontally by cylindrical lenses, optical fibers, or planar lightguides to illuminate a two-dimensional mask that represents the matrix A. Light from the mask, which has been reduced in intensity by local variations in the mask (transmittance function), is collected column by column and directed to discrete horizontally arrayed detectors. The outputs from such detectors represent the components of an output vector y, when y is given by the matrix-vector product y=Ax. Such a device, however, suffers from several potentially serious limitations, including limited accuracy with which the source intensities can be controlled and the output intensities read; the matrix A cannot be updated rapidly.

Thus, it is well known to utilize a plurality of input sources such as light emitting diodes having intensities that apply light through cylindrical lenses onto a photographic matrix such as a mask or film. For example, let us consider a 2×2 pixel mask. The point sources of light from the light emitting diodes are displayed as lines on the mask, vertical lines for example. Then light from the top half of the photographic plate is displayed onto a plurality, such as a pair, of vertically disposed detectors by way of a horizontal cylindrical lens so as to converge the upper half of the light from the photographic plate to a point source, or pixel, at the detector $Y_1$.

Similarly, for $X_2$ intensity, from a second LED, light would be displayed at the right half portion of the photographic mask, via a vertically disposed cylindrical lens. And light from the bottom half of the mask can be supplied therefrom through a horizontally oriented cylindrical lens to the bottom half of the detector. All of the foregoing is well known in the prior art.

SUMMARY OF THE INVENTION

Another object of this invention is to provide an updatable programmable mask for use in performing digital matrix multiplication using cavityless, optical bistability.

Still another object of this invention is to provide new and improved apparatus for optical digital matrix multiplication utilizing an updatable programmable mask (matrix) which can be controlled by addressing it with an optical beam. Each element of this matrix is a multistable device in which the transmission can be determined by addressing it with an optical beam whose intensity controls the transmission state.

Still yet another object of this invention is to provide a new and improved optical multistable device that permits digital computation with high accuracy and in which two-dimensional arrays of multistable devices operate as a two-dimensional updatable spatial light modulator.

Yet still another object of this invention is to provide new and improved optical digital matrix multiplication apparatus that can be switched relatively rapidly.

In accordance with one aspect of this invention, apparatus for optical digital matrix multiplication includes a first plurality of control means for providing a like first plurality of optical control beams. The control beams are directed along paths excluding a prohibited area. Programmable optical matrix means have a like first plurality of pixels oriented thereabout. The pixels have variable discrete optical densities dependent upon the intensities of the control beams that are directed thereupon. A second plurality of light sources provide a like second plurality of focused parallel sheets of light onto the pixels. The sheets of light are directed in directions other than the directions of the control beams. Detecting means, oriented in the prohibited area, receive light transmitted along a third plurality of parallel planes. The parallel planes are orthogonal to the second plurality of parallel sheets of light. Means focus light along each of the planes onto corresponding ones of the detecting means.

In accordance of certain features of the invention, the first plurality is i, the second plurality is j, the third plurality is k, and i=j×k; j can equal k.

The equation "i=j×k" refers to the multiplication of j and k not the size of matrix i. The sizes of matrices i, j and k are governed by the rules of matrix multiplication and the physical limitations of the device in question which is determined by outside physical constraints( e.g., area of the crystal, power of the laser available).

In accordance with certain features, the means for providing a second plurality of light sources includes a like second plurality of cylindrical lenses for focusing the parallel sheets of light. The means for focusing light along each of the planes can include a like third plurality of cylindrical lenses. The third plurality of cylindrical lenses can be oriented orthogonal to the second plurality of cylindrical lenses. The programmable optical matrix means can include a cadmium sulfide platelet. The cadmium sulfide platelet can be implanted with ions. The cadmium sulfide platelet can be implanted with impurities having different binding energies. The impurities can be selected from a group consisting of lithium, sodium and aluminum, among others.

BRIEF DESCRIPTION OF THE DRAWINGS

Other objects, advantages and features of this invention, together with its construction and mode of operation, will become more apparent from the following description, when read in conjunction with the accompanying drawings, in which.

DESCRIPTION OF PREFERRED EMBODIMENT(S)

The basic element of the two-dimensional light modulator that represents the time dependent matrix A is a cavityless optical multistable device 11 which is similar in concept to a cavityless optical bistable device that is described in copending U.S. patent application Ser. No. 713,510, filed Mar. 19, 1985 by Mario Dagenais and Wayne Sharfin, two of the co-invertors hereof. As that copending U.S. patent application has since become abandoned, its subject matter is incorporated herein by reference.

The cavityless optical multistable optical device 11 is created by ion implantation of a high purity cadmium sulfide platelet with different types of ions to generate different types of bound excitons with different binding energies. These resonances are very sharp and can be well separated. By increasing the intensity of a laser incident on the cavityless optical multistable device 11 and tuned below any of the newly created resonances, the material of the device 11 starts heating. The more heat that is generated in the device 11, the more the closest resonance moves toward the beam until the resonance overshoots the spectral position of the laser and the device switches to a state of lower transmission. As the intensity of the laser continues to increase, the process repeats itself with the following resonances. The amount of light absorbed or transmitted by the different bound exciton resonances can be controlled by implantation flux, resulting in discrete transmission steps in the output which can be used to represent the matrix elements in a digital form. The components of the incident vector can also be put in digital form in a similar way, adding to the accuracy of the vector-matrix multiplication as discrete levels are used. The spatial light modulator can be updatable in real time by changing the biasing (light level) conditions on each bistable device.

The advantage of this invention resides in a programmable matrix and in that a digital output is provided. Digital vector matrix multiplication can be performed as described hereinafter.

With this invention, the device 11 is a multistable device having multiple absorption lines corresponding to states of increasing absorption. Thus, the highest level of transmission might be a state four and then, if the device is next addressed with even greater intensity, it will switch to a state of lower transmission three, and then if even higher intensity is applied, it will switch to a state of even lower transmission two, and so on down to zero transmission. In this manner, a multistable device is achieved that can be used as a programmable matrix element in an array.

Figure 1A:
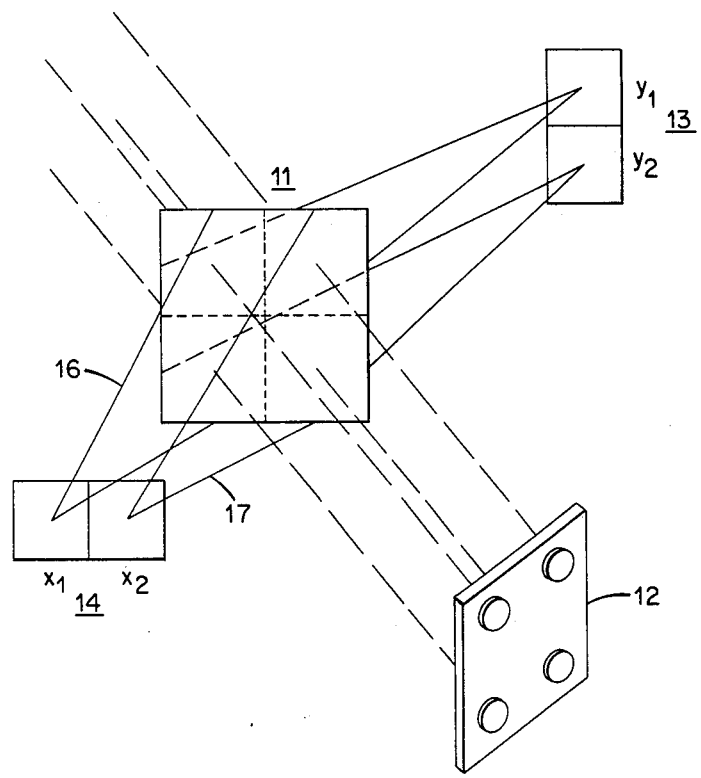
FIG. 1a is a schematic diagram of one embodiment of the invention.
Figure 1B:
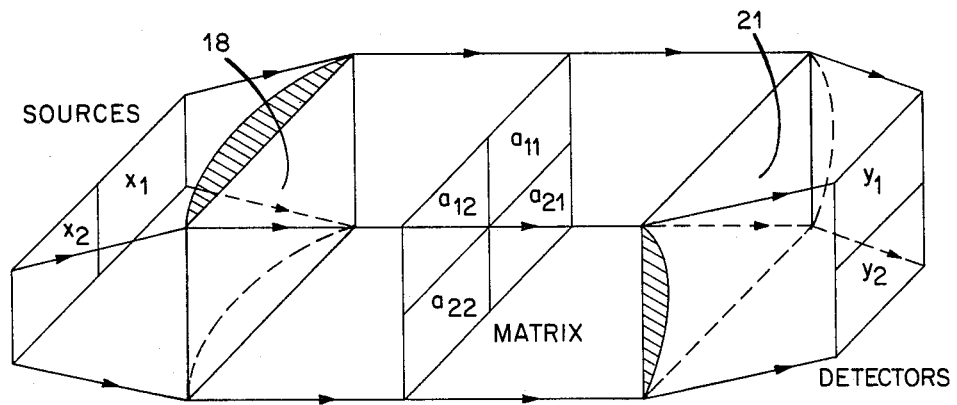
FIG. 1b is another view of the invention as depicted in FIG. 1a, further including sets of lenses.
Figure 2:
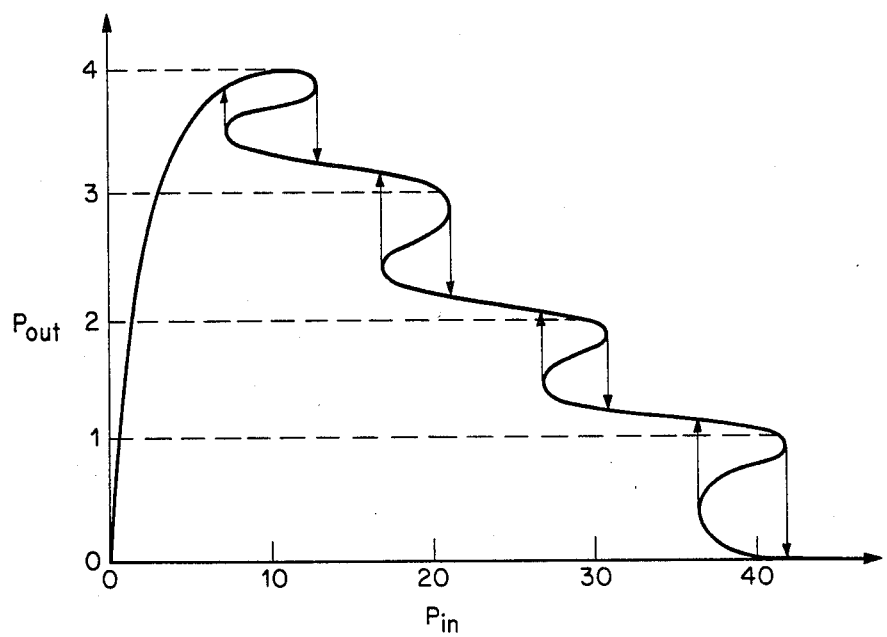
FIG. 2 is a chart of optical power out vs. optical power in for setting transmission of the matrix element.
Figure 3:
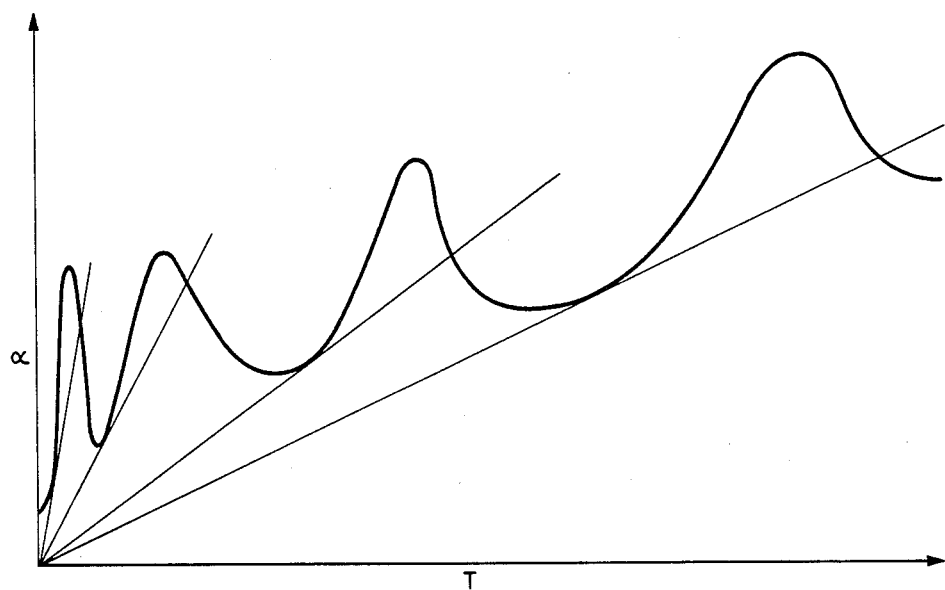
FIG. 3 is a chart of absorption vs. wavelength indicating multistability by induced absorption in accordance with a preferred embodiment of the invention.

Referring to FIGS. 1a and 1b, there is depicted the programmable element 11. The element 11 is implanted with ions of various types to generate a device which is capable of transmitting different quantities of light depending upon a controlled intensity of controlled light impressed thereupon to set the transmission of the matrix element as depicted in FIG. 2. Referring to FIG. 2, it is seen that as the controlled intensity of the light directed to the element 11 is increased, the transmission is increased to a level four. Further increase of the controlled intensity causes the transmission to drop down to a level three. Further addition of a controlled intensity of light to the element 11 will eventually cause the transmission to step down to a level two. Likewise, continued increased intensity will cause the transmission to drop down to state one, and, again, later on, with even more increased intensity to drop down to state zero. Thus, discrete transmission steps are observed at the output and can be used to represent the matrix element in a digital form. The components of the incident vector can also be put in digital form in a similar way, adding to the accuracy of vector-matrix multiplication as discrete levels are used. As depicted in FIGS. 1a and 1b, the laser light that controls the device 11 is provided from a controlled source 12. The laser light from the source 12 is directed to the device 11 and travels paths other than through a prohibited area which will be clarified hereinafter. The light from the laser source 12 that sets the transmission of the matrix element 11 is continually provided. The light is headed in a direction other than towards the detectors 13, which are located in the prohibited area, so that such light does not influence the detector 13 sensitivity or output. The matrix 11 can be changed by varying the intensity of the light that is applied from the laser 12 for setting the transmission of the matrix element 11.

The vector light from the source 14 representing a plurality of quantities such as, for example, $X_1$ and $X_2$, are directed along parallel paths or sheets 16, 17 onto various pixels on the device 11. For simplification, the device 11 is shown as having four pixels or picture elements. Obviously, the device 11 could be created to have numerous more elements. Light from the vector source 14 which is represented by the quantities $X_1$ and $X_2$ are preferably directed via vertically oriented cylindrical lens or lenses 18. The light being transmitted through the device 11 is directed to the detectors 13 via horizontally disposed cylindrical lens or lenses 21.

The characteristics required for fabricating the apparatus of this invention are unique to the system, utilizing a bound exciton where the strength of the absorption peaks and the wavelength of the absorption peaks can be controlled in the fabrication process, in this case by ion implantation.

What is claimed is:

1. Apparatus for optical digital matrix multiplication comprising a first plurality of control means for providing a first plurality of optical control beams, wherein the number of said optical control beams is substantially equal to the number of said control means, said optical control beams having intensities that are digitally programmable to various multistable states, said control beams being directed along paths excluding a prohibited area;

programmable optical matrix means having a first plurality of pixels oriented thereabout, wherein the number of said pixels is substantially equal to the number of said control beams, said pixels having variable discrete densities dependent upon the intensities of said control beams being directed thereupon;

means for providing a second plurality of light sources for providing a second plurality of focused parallel sheets of light onto said pixels, wherein the number of said sheets of light is substantially equal to the number of said light sources, said sheets of light being directed in directions other than the directions of said control beams;

detecting means oriented in said prohibited area for receiving light transmitted along a third plurality of parallel planes, said parallel planes being orthogonal to said second plurality of parallel sheets of light; and means for focusing light along each of said planes onto corresponding ones of said detecting means.

2. The apparatus as recited in claim 1 wherein each of said first pluralities is i, each of said second pluralities is j, said third plurality is k, and wherein $i = j \times k$.

3. The apparatus as recited in claim 2 wherein j equals k.

4. The apparatus as recited in claim 1 wherein said means for providing a second plurality of light sources includes a second plurality of cylindrical lenses for focusing said parallel sheets of light, the number of said second plurality of cylindrical lenses being substantially equal to the number of said light sources; and wherein said means for focusing light along each of said planes includes a third plurality of cylindrical lenses, the number of said third plurality of cylindrical lenses being substantially equal to the number of said parallel planes.

5. The apparatus as recited in claim 4 wherein said third plurality of cylindrical lenses are oriented orthogonal to said second plurality of cylindrical lenses.

6. The apparatus as recited in claim 1 wherein said programmable optical matrix means includes a cadmium sulfide platelet.

7. The apparatus as recited in claim 6 wherein said cadmium sulfide platelet is implanted with ions.

8. The apparatus as recited in claim 7 wherein said cadmium sulfide platelet is implanted with impurities having different binding energies.

9. The apparatus as recited in claim 8 wherein said impurities which bind excitons are selected from a group consisting of lithium, sodium, and aluminum.

* * * * *